Nov. 4, 1952  G. R. SHADLEY ET AL  2,616,207
MINNOW BOOT
Filed Oct. 22, 1949
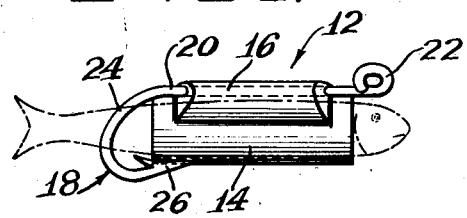
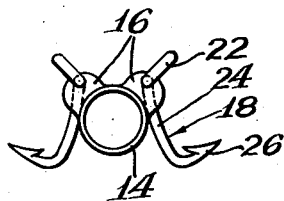
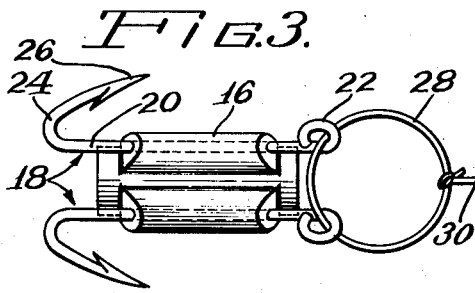
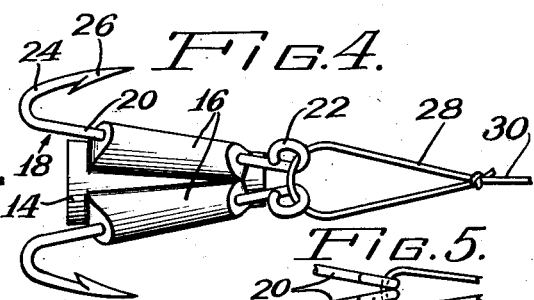
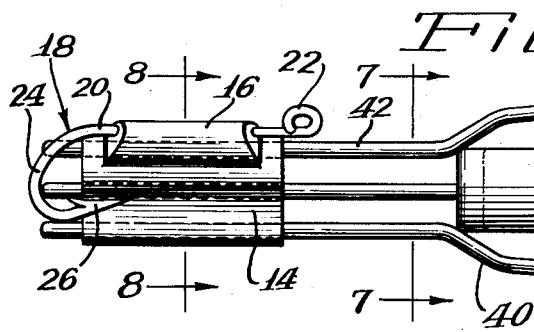
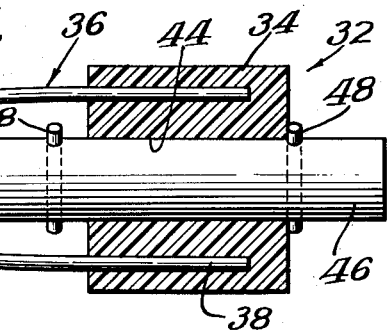
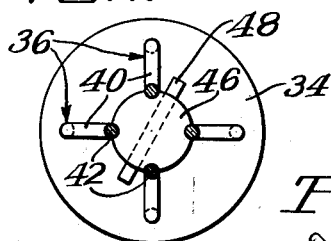
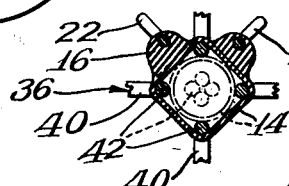
Inventors:
George Roy Shadley
William Leo Martin
By Bair & Freeman
Attorneys Patented Nov. 4, 1952

2,616,207

UNITED STATES PATENT OFFICE 2,616,207

MINNOW BOOT

George R. Shadley and William Leo Martin, Ottumwa, Iowa

Application October 22, 1949, Serial No. 122,998

7 Claims. (Cl. 43—44.4)

This invention relates to a minnow boot, and more particularly a device for retaining live bait during a casting operation in fishing.

As is well known, live bait is considered more effective than artificial bait or dead bait and it is difficult to properly retain bait in live condition during a casting operation.

An object of the invention is the provision of a novel minnow boot for retaining a live minnow which affords almost complete protection to the minnow in long hard casts.

Another object is the provision of such a minnow boot which retains a live minnow and permits the minnow free and natural movement to swim when it is cast into the water.

Still another object is the provision of a minnow boot which is transparent so that the greater part of the minnow shows through the minnow boot and is therefore more effective than if a substantial portion of the minnow were concealed.

A further object of the invention is the provision of a minnow boot made of a stretchable and elastic material having a tubular portion which surrounds a substantial portion of the minnow and effectively secures the minnow in position and prevents its escape in the casting operation.

A still further object is the provision of a novel expander for expanding the elastic minnow boot for insertion of the minnow therein.

Another object is the provision of a novel type minnow boot having a pair of fish hooks therein so arranged and connected with a fishline that, when a strike is made and the minnow boot pulled, the reaction of the fishline causes a spreading action of the fish hooks to more effectively hook into the fish's mouth.

Still another object is the provision of a novel minnow boot having a pair of fish hooks, such that when a strike is made and the reaction of the fishline is effected, the fish hooks are not only caused to spread bodily apart but to spread with a diverging action so that the points of the hook more effectively penetrate into the fish's mouth.

Still another object is the provision of a novel minnow boot of the character above referred to which not only is effective for retaining a live minnow therein but is also effective for use with frogs, crickets and other live bait as well as processed or commercial bait.

With these and other objects in view, our invention consists in the construction, arrangement and combination of the various parts of our minnow boot, whereby the objects contemplated are attained, as hereinafter more fully set forth, pointed out in our claims and illustrated in the accompanying drawings, wherein:

Figure 1 is a side view of the minnow boot of the present invention showing a minnow in position therein;

Figure 2 is a view from the right of Figure 1;

Figure 3 is a top view of the minnow boot shown in Figure 1 in normal position;

Figure 4 is a top view showing the position of the fish hooks in spread apart relation;

Figure 5 illustrates the right hand portion of Figure 4 showing the eyelets of the fish hooks in a different position;

Figure 6 shows the minnow boot and the novel expander therein by which the minnow boot is expanded ready to receive a minnow;

Figure 7 is a view taken on line 7—7 of Figure 6;

Figure 8 is a view taken on line 8—8 of Figure 6;

Figure 9 is a modified form of minnow boot showing a perforated tubular element; and Figure 10 is another modified form of minnow boot showing a portion of the tubular element cut away.

Referring now in detail to the drawings, the minnow boot is indicated by the reference numeral 12 and includes a tubular element 14 which in normal retracted position is generally cylindrical as illustrated in Figure 2. The tubular element 14 is preferably molded of transparent latex which possesses great elastic properties. On the outer surface of the tubular element 14 are projections 16, which in this case are illustrated as two separate and spaced apart projections, but if desired, a single wide projection may be employed. The projections 16 are of the same material as the tubular element 14 and they are molded in the molding operation that produces the tubular element.

A pair of fish hooks are indicated at 18 and each comprises a shank portion 20 with an eyelet 22 at one end and a hook element 24 at the other end, the hook element having a point 26. The fish hooks 18 are placed in position in the molding operation of the boot proper with the shank portions 20 imbedded directly in the projections 16. The shank portions 20 are bonded to the material of the projections 16 so that they normally remain in a predetermined position relative to each other.

The fish hooks 18 are positioned such that the eyelets 22 extend generally radially outwardly from the tubular element 14 in diverging relation to each other. It will also be noted that the eyelets 22 are disposed adjacent one end of the tubular element and actually extend axially therebeyond at that end, while the hook elements 24 are adjacent the opposite end of the tubular element and extend from the shanks in what might be considered a direction generally opposite to the eyelets 22. Figure 2 clearly shows the relationship and while the hook elements are not directly opposite the eyelets they do extend downwardly with respect to the eyelets so that when the eyelets are forced together the hook elements are spread apart. The hook elements 24 as observed in Figures 2 and 3 normally diverge apart with respect to each other.

A loop 28 is threaded through the eyelets 22 and secured to a fishline 30. The loop 28 is preferably flexible for a purpose to be explained hereinafter.

The novel expander is indicated generally by the reference numeral 32 as illustrated in Figure 6 and includes a body member 34 which may be of any preferred material such as plastic. The body member 34 consists essentially in a block for mounting the remainder of the elements making up the expander and is of a convenient size for handling in the hand. A plurality of prongs 36 is mounted in the body member 34, the inner ends of the prongs as indicated at 38 being imbedded in holes in the body member 34. The prongs 36 are spaced circumferentially around the body member adjacent the periphery thereof, and extend longitudinally therefrom. Intermediate the ends of each prong is a bent-in portion 40 and the outer end is indicated at 42. The prongs 36 are of spring wire material and are so constructed that they normally are biased in toward each other to such a position that the outer ends 42 are in engagement with one another in a closely compacted cluster. This arrangement is shown in dotted lines in Figure 8.

The body member 34 is provided with a longitudinal opening 44 in which is mounted a slidable plunger 46 which is also preferably of plastic, having pins 48 therein adapted to engage the respective ends of the body member 34 for preventing the plunger from being accidentally withdrawn from the hole 44 while permitting the necessary longitudinal movement of the plunger. The plunger 46 is disposed centrally of the body member and is adapted to engage the bent-in portions 40 which act as wedging surfaces and the plunger thereby effects spreading of the prongs and particularly the outermost portions 42 thereof.

Before proceeding to a description of the use and operation, reference will be made to Figures 9 and 10 showing modified forms. In Figure 9 the minnow boot has a tubular element 14a which is the same as the tubular element 14 previously described except that the tubular element 14a in this case is perforated. Otherwise the minnow boot of Figure 9 is the same as the form previously described.

In Figure 10 the tubular element is indicated by the numeral 14b and in this case is made up of a pair of longitudinally spaced bands 50. The bands 50 are connected together principally by the projections 16 but also by a portion such as 52 adjacent the projections 16. The portions 50 may be referred to as bands connected together or the tubular element 14b may be referred to as a tubular element with a portion cut out. In either case when the minnow is inserted therein it is held in position by the pressure exerted by the portions 50.

Use and operation

In normal position of the minnow boot a shape is assumed such as illustrated in Figure 2. This tubular or cylindrical shape is superimposed on Figure 8. The expander 32 when in normal retracted position is so disposed that the outer portions 42 of the prongs are self-biased inwardly toward each other in a cluster illustrated in Figure 8. These outer portions 42 are then inserted into the tubular portion 14 of the minnow boot. When the expander is retracted the plunger 46 is of course retracted to the dotted line position in Figure 6 and after the prongs are inserted in the minnow boot the plunger 46 is pressed inwardly and the inner end of the plunger engages the bent portions 40 and causes spreading of the bent portions and of the inner portions 42. The tubular element 14 is such that it expands readily under the spreading action of the prongs and the minnow is then inserted into the minnow boot. After the minnow is thus inserted it is held in position by one hand and the expander 32 is then withdrawn. The minnow is held in position by the gripping action of the tubular element 14 which as explained above has a high elastic property and returns to normal position, gripping the minnow. A substantial portion of the minnow is gripped by the tubular element 14 by friction and escape of the minnow is prevented. Furthermore, since a substantial portion of the minnow is encased, there is less likelihood of injury to the minnow in long hard casts. Another advantageous point is that a considerable portion of the minnow extends beyond the end of the tubular element which permits the minnow a considerable degree of freedom of movement so that the minnow can swim when cast in the water. The action of the minnow as is well known increases the effectiveness of the minnow as bait.

When a strike is made a pulling action on the minnow boot is caused and the fishline reacts to that pulling action. The loop 28 is flexible and when the line is pulled against the strike the loop 28 tends to straighten out as indicated in Figure 4. The pulling action of the line causes the eyelets 22 to be drawn bodily together, the action turning the shanks and twisting the projections 16, causes the hook elements 24 to spread bodily apart. This relationship is shown in Figure 4 and the effectiveness of the feature is believed apparent. The spreading action of the hook elements aids in the penetration of the hook elements into the fish's mouth. The tubular element 14 is of sufficiently resilient and stretchable properties that it can be distorted as illustrated in Figure 4 to permit twisting of the projections 16 and spreading of the hook elements 24.

In addition to the bodily movement together of the eyelets 22 as above explained, and the bodily spreading apart of the hook elements 24, the eyelets 26 are moved together at their upper and outermost portions. The pressure of the loop 28 on the eyelets causes the upper ends, or the extremities, of the eyelets to be pulled together, as shown in Figure 5, and since the eyelets are originally in diverging relation with respect to each other the shanks of the fish hooks are twisted and this twisting action causes a twisting action of the hook elements 24. Thus in addition to the bodily spreading apart of the hook elements there is a twisting or divergent spreading action thereof. This action also aids in the penetration of the hooks into the fish's mouth.

The tubular element 14a in Figure 9 permits a greater degree of movement of the minnow because of the perforations in the tubular element.

The minnow boot shown in Figure 10 is advantageous in that a greater portion of the minnow is exposed directly instead of by means of the transparency of the minnow boot. A more realistic effect is caused and in addition the minnow has greater freedom of movement for swimming action. The minnow boot may also be of a luminous substance, or coated with a luminous coating, for the purpose of more readily attracting a fish.

It is also contemplated that a minnow boot having a single fish hook is within the scope of the present invention. In the case of a single fish hook the minnow boot will have the advantages above pointed out as to protection to the minnow in casts, the appearance of the minnow and the freedom of movement of the minnow.

While we have herein shown and described preferred embodiments of our invention, manifestly it is susceptible of modification without departing from the spirit and scope thereof. We do not, therefore, wish to be understood as limiting our invention to the precise form herein disclosed, except as we may be so limited by the appended claims.

What we claim as our invention:

1. A minnow boot comprising an elastic tubular element, resilient projections constituting a part of the outer surface of said tubular element, a pair of fish hook means each having a shank, a hook element at one end and an eyelet at the other end, said shanks being embedded in said projections in spaced apart relation and extending generally longitudinally of the tubular element, said eyelets being adapted for threading a flexible line therethrough whereby when a pulling force is applied to said tubular element the reaction of the flexible line causes said eyelets to be drawn together and said hook elements to be spread apart.

2. A minnow boot comprising an elastic tubular element, resilient projections constituting a part of the outer surface of said tubular element, a pair of fish hook means each having a shank, a hook element at one end and an eyelet at the other end, said shanks being embedded in said projections in spaced apart relation and extending generally longitudinally of the tubular element, said eyelets being disposed at one end of the tubular element and extending radially outwardly from the tubular element in diverging relation to each other, said hook elements being disposed at the opposite end of the tubular element and extending generally across the end of the tubular element, said eyelets being adapted for threading a flexible line therethrough, whereby when a pulling force is applied to said tubular element the reaction of the flexible line causes said eyelets to be drawn bodily together and said hook elements to be spread bodily apart, and causes the radially outer extremities of said eyelets to be drawn together effecting twisting of said shanks and divergent spreading of the points of said hook elements.

3. A minnow boot comprising an elongated, elastic, seamless, tubular element open at the ends thereof, a resilient projection integral with said tubular element and located on the outer surface thereof and extending longitudinally of said tubular element, and fish hook means comprising a fish hook having a shank imbedded in said resilient projection, an eyelet on one end of said fish hook, and a hook at the other end thereof, said eyelet and hook being disposed exteriorly of the tubular element and of the axial projection thereof, whereby the entrance through either end of the tubular element is unobstructed.

4. A minnow boot comprising an elongated, elastic, seamless, tubular element open at the ends thereof, a plurality of resilient projections integral with said tubular element located on the outer surface thereof and extending longitudinally of the tubular element, and a plurality of fish hook members having shanks imbedded in said resilient projections, eyelets on said fish hook members located at one end of said boot and hooks on said fish hook members located at the other end of said boot, said tubular element being radially stretchable for insertion thereinto of a minnow, and being adapted to resiliently secure the minnow therein when the radial stretching force is removed.

5. A minnow boot comprising an elongated, elastic, seamless, tubular element open at the ends thereof, a plurality of resilient projections integral with said tubular element located on the outer surface thereof and extending longitudinally of the tubular element, and a plurality of fish hook members having shanks imbedded in said resilient projections, eyelets at one end of said shanks located at one end of said boot and hooks on the other end of said shanks located at the other end of said boot, said tubular element being radially stretchable for insertion thereinto of a minnow, and being adapted to resiliently secure the minnow therein when the radial stretching force is removed, said eyelets and hooks being disposed exteriorly of the tubular element and of the axial projection thereof, whereby the entrance through either end of the tubular element in unobstructed.

6. A minnow boot comprising an elongated, elastic, seamless, tubular element open at the ends thereof, a plurality of resilient projections integral with said tubular element located on the outer surface thereof and extending longitudinally of the tubular element, a plurality of fish hook members having shanks imbedded in said resilient projections, eyelets on said fish hook members located at one end of said boot and hooks on said fish hook members located at the other end of said boot, said tubular element being radially stretchable for insertion thereinto of a minnow, and being adapted to resiliently secure the minnow therein when the radial stretching force is removed, said eyelets and hooks being disposed exteriorly of the tubular element and of the axial projection thereof, whereby the entrance through either end of the tubular element is unobstructed, and said tubular element being transparent so that substantially all of the minnow shows therethrough.

7. A minnow boot comprising a plurality of spaced, elastic, seamless, tubular elements and an elastic longitudinal element interconnecting said spaced tubular elements, a plurality of resilient projections integral with said longitudinal element and located on the outer surface thereof and extending longitudinally thereof, and a plurality of fish hook members having shanks imbedded in said resilient projections, eyelets on said fish hook members located adjacent one end of said longitudinal element and hooks on said fish hook members located adjacent the other end of said longitudinal element, said tubular elements being radially stretchable for insertion thereinto of a minnow, and being adapted to resiliently secure the minnow therein when the stretching force is removed.

GEORGE R. SHADLEY.
WILLIAM LEO MARTIN.

REFERENCES CITED

The following references are of record in the file of this patent:

UNITED STATES PATENTS

| Number | Name | Date |
|---|---|---|
| 1,488,901 | Armstrong | Apr. 1, 1924 |
| 1,669,053 | Hamel | May 8, 1928 |
| 1,673,978 | Guindon | June 19, 1928 |
| 2,102,739 | Peters | Dec. 21, 1937 |
| 2,202,519 | Ferris | May 28, 1940 |
| 2,432,940 | Schomaker | Dec. 16, 1947 |
| 2,476,553 | L'Hullier | July 19, 1949 |

FOREIGN PATENTS

| Number | Country | Date |
|---|---|---|
| 332,509 | Great Britain | July 24, 1930 |